United States Patent
Aalderink

(10) Patent No.: US 9,096,108 B2
(45) Date of Patent: Aug. 4, 2015

(54) WHEEL AXLE SUSPENSION

(75) Inventor: Derk Geert Aalderink, Laren (NL)

(73) Assignee: VDL Weweler B.V., Apeldoorn (NL)

( * ) Notice: Subject to any disclaimer, the term of this patent is extended or adjusted under 35 U.S.C. 154(b) by 0 days.

(21) Appl. No.: 14/116,894

(22) PCT Filed: May 12, 2011

(86) PCT No.: PCT/NL2011/050325
§ 371 (c)(1),
(2), (4) Date: Feb. 12, 2014

(87) PCT Pub. No.: WO2012/154032
PCT Pub. Date: Nov. 15, 2012

(65) Prior Publication Data
US 2014/0197614 A1   Jul. 17, 2014

(51) Int. Cl.
B60G 9/00   (2006.01)
B60G 11/27  (2006.01)

(52) U.S. Cl.
CPC  *B60G 9/00* (2013.01); *B60G 9/003* (2013.01); *B60G 11/27* (2013.01); *B60G 2200/31* (2013.01); *B60G 2202/152* (2013.01); *B60G 2204/148* (2013.01); *B60G 2204/4306* (2013.01)

(58) Field of Classification Search
CPC ............. B60G 2204/4306; B60G 2204/43065; B60G 2204/148; B60G 9/003; B60G 9/00; B60G 11/27; B60G 2200/31; B60G 2202/152; B60G 7/008
USPC .................................................. 280/124.116
See application file for complete search history.

(56) References Cited

U.S. PATENT DOCUMENTS

| 1,422,956 | A  | * | 7/1922  | Gaar .............................. 267/52 |
| 4,858,949 | A  |   | 8/1989  | Wallace |
| 4,991,872 | A  |   | 2/1991  | Richardson |
| 5,171,036 | A  |   | 12/1992 | Ross |
| 7,077,413 | B2 | * | 7/2006  | Svartz et al. ........... 280/124.164 |
| 8,490,989 | B2 | * | 7/2013  | Piehl et al. ............... 280/124.11 |

FOREIGN PATENT DOCUMENTS

| EP | 1 273 464 A1 | 1/2003 |
| FR | 2 841 182 A1 | 12/2003 |
| WO | WO 2009/014423 A1 | 1/2009 |

OTHER PUBLICATIONS

International Search Report for PCT Application No. PCT/NL2011/050325, European Patent Office, mailing date Nov. 30, 2011, 8 pages.

* cited by examiner

*Primary Examiner* — Paul N Dickson
*Assistant Examiner* — Timothy Wilhelm
(74) *Attorney, Agent, or Firm* — Sterne, Kessler, Goldstein & Fox P.L.L.C.

(57) ABSTRACT

A wheel axle suspension for attaching a wheel axle to a vehicle chassis has a trailing arm extending crosswise to the axle body and an axle pad arranged between the axle body and the trailing arm. At least one clamping strap, having a generally U-shape with a front leg and a rear leg, extends around the axle body. Strap nuts are provided on the strap legs for tightening the axle body, the axle pad and the trailing arm together. A clamping part is arranged on the side of the arm facing away from the axle body, which clamping part has side portions which extend beyond the side edges of the trailing arm. The trailing arm is provided at a location at the rear side of the axle body with at least one recess for receiving the end portion of the rear legs of the clamping straps.

11 Claims, 4 Drawing Sheets

WHEEL AXLE SUSPENSION

BACKGROUND OF THE INVENTION

The present invention relates to a wheel axle suspension for attaching a wheel axle to a vehicle chassis. The wheel axle suspension comprises a trailing arm with a front end that is hingedly coupled to the chassis and which extends crosswise to the axle body. Furthermore the wheel axle suspension comprises an axle pad which is arranged between the axle body and the trailing arm, which has a recess in which part of the circumference of the axle body is received, and which has a side facing away from the axle body that engages the arm. At least one clamping strap extends around the axle body, each clamping strap having generally a U-shape with a front leg and a rear leg, strap nuts being provided on at least the front or rear strap legs for tightening the axle body, the axle pad and the trailing arm together. Moreover, the wheel axle suspension comprises a clamping part arranged on the side of the arm facing away from the axle body, which clamping part has side portions which extend beyond the side edges of the trailing arm, which side portions are provided with bores through which end portions of the strap legs extend, said clamping part constituting a counter-part to tighten the axle body, the axle pad and the trailing arm together.

Such a wheel axle suspension is known, for example from EP 1 273 464 A1. This known wheel axle suspension has an axle clamping assembly with a front clamping part, which is coupled with the front legs of the respective clamping straps, and a rear clamping strap, which is coupled with the rear legs of the respective clamping straps.

Usually there is arranged a bellows or air spring on the rear end portion of the trailing arm. The air spring is supported on its upper end by the chassis. In some applications, such as for example in a tipper, it is desirable that the air spring does not extend beyond the rear end of the vehicle, because that provides an increase of the risk that the air spring is damaged.

SUMMARY OF THE INVENTION

The present invention has for an object to provide an axle attachment assembly which has a shorter construction length.

This object is achieved by a wheel axle suspension of the type as described at the outset, in which the clamping part is arranged at the front side of the axle body, such that the front leg of each of the clamping straps extends through the bores in the clamping part, and, wherein the trailing arm at a location at the rear side of the axle body is provided with at least one recess for receiving the end portion of the rear legs of the clamping straps.

In the arrangement according to the invention a rear clamping part associated with the rear legs of the clamping straps can be omitted. Thereby less space is occupied on the upper side of the trailing arm, i.e. the side of the trailing arm facing away from the axle body. This allows that a bellows or air spring may be positioned on the arm more to the front than with the existing wheel axle suspension. Thereby a shorter construction length of the suspension assembly is achieved.

In a preferred embodiment the at least one recess that is provided is constituted by a through bore through which the rear legs of the clamping straps extend. Preferably the clamping straps are two separate parts, the rear legs of which are passed through two separate through bores in the trailing arm.

In a possible other embodiment two clamping straps, which each extend on one side of the trailing arm may be formed monolithically.

The rear legs of the monolithically formed straps may have an end portion that is bended in the width direction of the trailing arm towards the other rear leg, the bended end portions constituting a bridge portion that extends over the upper side of the trailing arm in width direction. Preferably, the recess for receiving the end portion of the rear legs of this embodiment is a groove in which the bridge portion is received.

Two clamping straps may also be formed monolithically in such a way that the rear legs merge into each other to form one leg with one threaded end. As a consequence only one through bore needs to be provided in the trailing arm for passing through the end portion of the rear leg.

In a preferred embodiment the distance between the front legs of the straps is greater than the distance between the rear legs. The front legs of the straps extend on either side of the trailing arm, whereby their mutual distance is determined by the width of the trading arm at that location. The rear legs of the straps extend through recesses in the trailing arm, preferably through one or more bores in the trailing arm, whereby the rear legs of the straps can be positioned closer to each other.

In another preferred embodiment an area surrounding the one or more through bores on the side of the trailing arm facing away from the axle body is countersunk with respect to the trailing arm surface more remote from the bore. The countersunk area can be provided by making a recess at the location of the through bores in the surface on the side of the trading arm facing away from the axle body. As a result of the countersunk area the nut arranged on the end of the strap leg concerned is, at least partially, countersunk in the trailing arm surface. A countersunk strap leg end and strap nut is advantageous, because it does not hamper another part, e.g. a bellows or air spring to be positioned on top of it. This advantage is also provided with the groove forming the recess in the embodiment with the monolithically formed straps with a bridge portion.

In a further preferred embodiment the wheel axle suspension furthermore comprises a pneumatic spring which is mounted to a rear end of the trailing arm, wherein the pneumatic spring is positioned over the ends of the rear legs, and in a preferred embodiment, corresponding strap nuts of the clamping straps. The air spring or bellows that is mounted over the rear strap ends, allows the air spring to be positioned close to or partly over the axle body. Thereby a short construction length is achieved, which is advantageous for certain specific vehicle applications.

In yet another preferred embodiment the front leg of the strap is longer than the rear strap.

The invention also relates to a clamping strap unit for a wheel axle suspension, said clamping strap unit comprising two clamping straps which in use extend around an axle body to be suspended, each clamping strap having generally a U-shape with a front leg and a rear leg, which in use extend on a front side and a rear side respectively of the axle body, wherein each strap leg is provided with a threaded end portion on which a nut can be screwed, wherein the two clamping straps are monolithically formed with the rear legs of the straps merging into each other to form one leg with one single threaded end.

The invention also relates to a clamping strap unit for a wheel axle suspension, said clamping strap unit comprising two clamping straps which in use extend around an axle body to be suspended, each clamping strap having generally a U-shape with a front leg and a rear leg, which in use extend on a front side and a rear side respectively of the axle body, wherein each front strap leg is provided with a threaded end portion on which a nut can be screwed, and wherein the two clamping straps are formed monolithically.

The invention will be further elucidated in the following detailed description with reference to the drawings.

DETAILED DESCRIPTION

Figure 1:
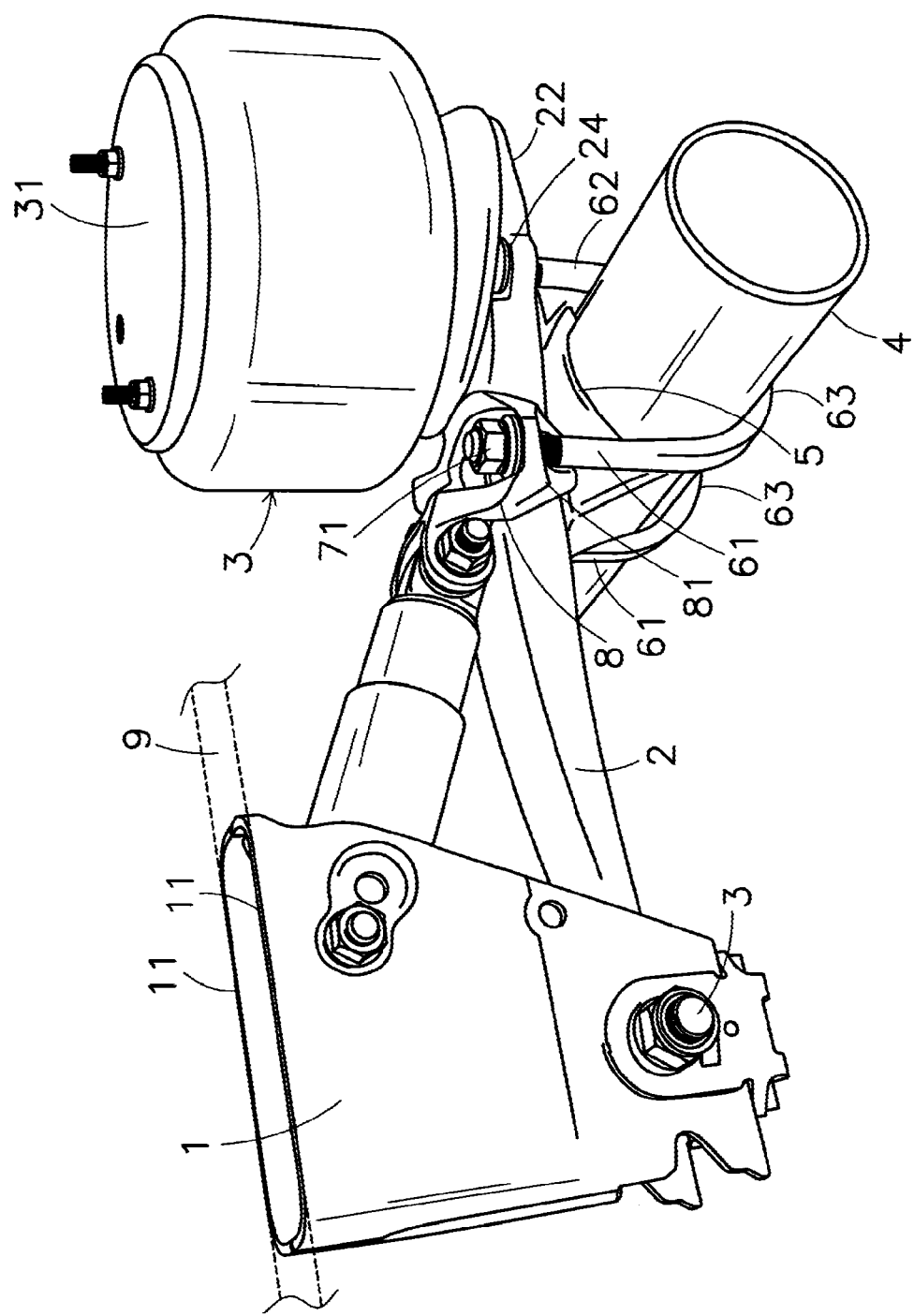
FIG. 1 shows a side view in perspective of a preferred embodiment of a wheel axle suspension according to the invention.
Figure 2:
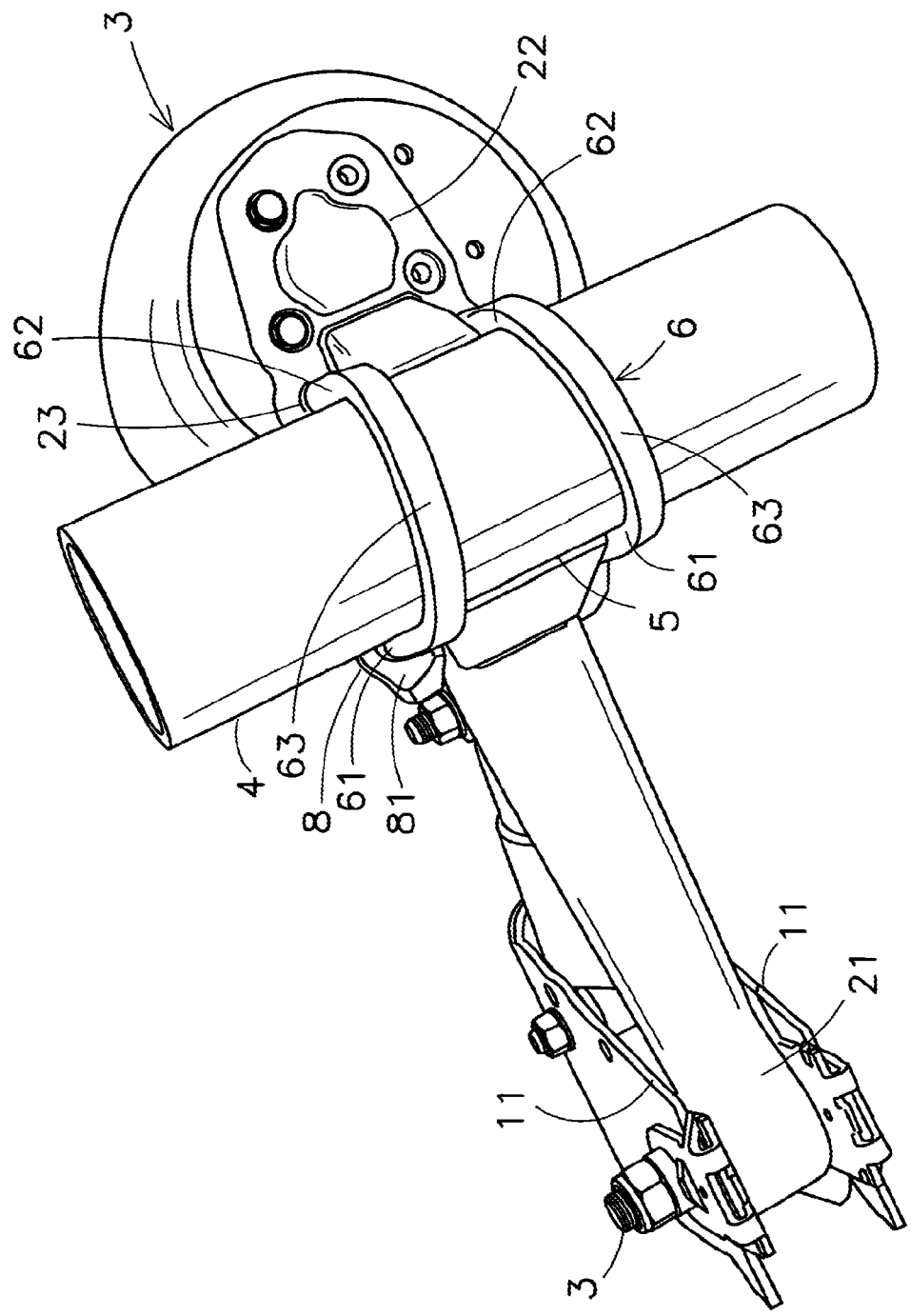
FIG. 2 shows a view in perspective from below of the wheel axle suspension of FIG. 1.
Figure 3:
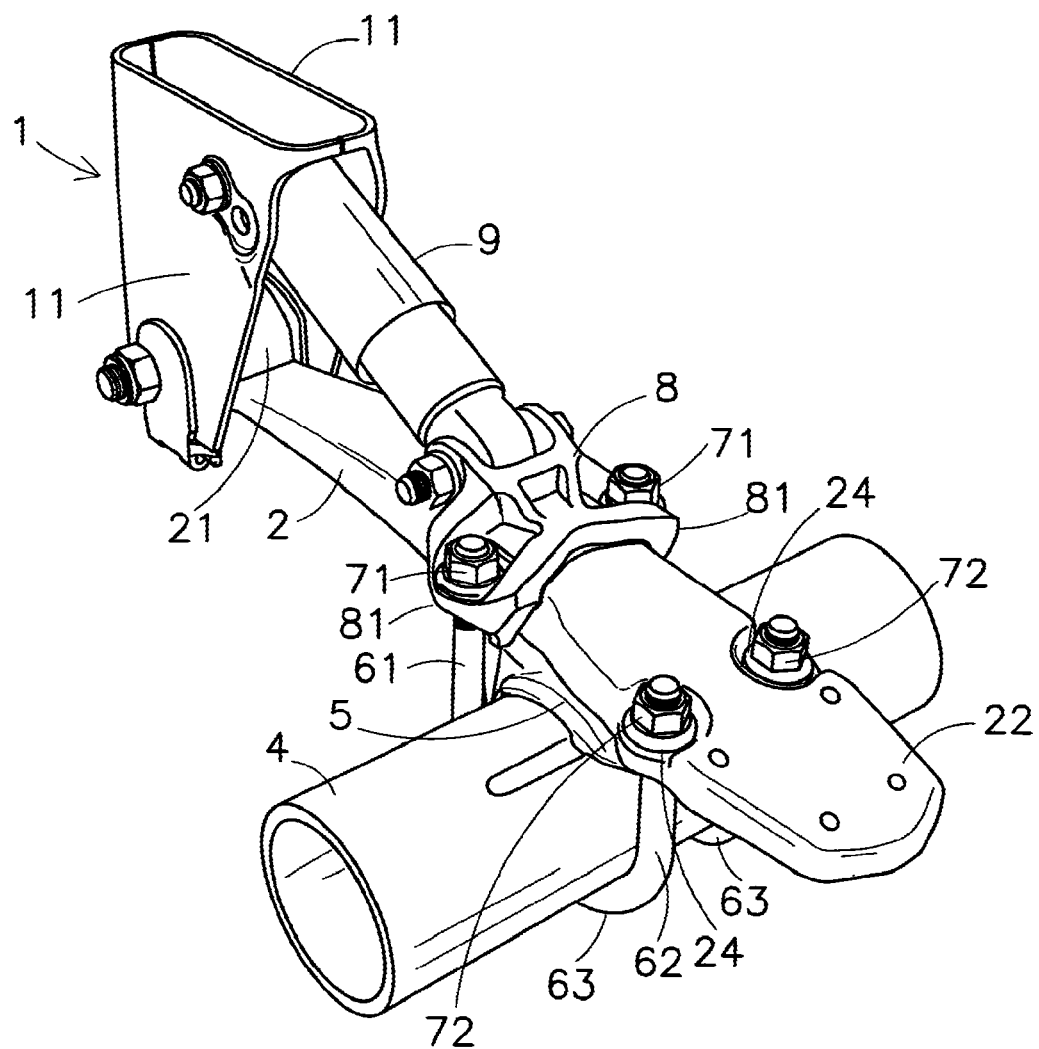
FIG. 3 shows another view in perspective of the wheel axle suspension of FIG. 1 with the air spring removed.

FIGS. 1-3 show in different views a possible embodiment of a wheel axle suspension according to the invention. For each axle, a wheel axle suspension as shown is provided on either side of the vehicle.

The wheel axle suspension comprises a carrier bracket 1 with two side plates 11. The carrier bracket 11 is at its upper end attached to the vehicle chassis 9, which is schematically indicated by dashed lines in FIG. 1.

The suspension assembly furthermore comprises a trailing arm 2. The trailing arm 2 has at its front end an attachment eye 21. The trailing arm 2 is hingedly attached to the carrier bracket 1 by a hinge bolt 3 that extends through the attachment eye 21 and bores in the side plates 11 of the carrier bracket 1.

The suspension assembly also comprises an air spring 3 (or bellows), which is attached to a rear end 22 of the trailing arm 2. The air spring 3 has an upper side 31 that is attached to a part of the vehicle chassis 9.

A hollow, relatively thin-walled axle body 4 is provided, which is attached to the trailing arm 2 by means of a clamping assembly. In the shown embodiment the axle body 4 crosses the trailing arm 2 substantially perpendicularly. The clamping assembly comprises an axle pad 5, which at an upper side engages the lower side of the trailing arm 2. The axle pad 5 has at a side facing away from the trailing arm 2 a recess in which part of the circumference of the axle body 4 is received. This is clearly visible in the FIGS. 1-3.

The clamping assembly furthermore comprises clamping straps 6, which in the embodiment shown are formed as substantially U-shaped straps with a front leg 61 and a rear leg 62 which are interconnected by a bent portion 63 that extends around the lower half of the circumference of the axle body 4. The legs 61 and 62 of the U-shaped straps have near their free ends a threaded portion which can cooperate with a threaded nut 71, 72 respectively so as to tighten the straps 6, in particular the bent portion 63 thereof against the axle body 4.

The clamping assembly also includes a front clamping part which is called a strap plate 8 here. The strap plate 8 extends over the upper side of the trailing arm 2 in the width direction and has two side portions 81 that extend beyond the respective sides of the trailing arm 2. The side portions 81 are provided with through bores through which the front legs 61 of the straps 6 pass. The corresponding nuts 71 that are screwed on the front legs 61 of the straps 6 engage an upper side of the strap plate 8, i.e. the side facing away from the trailing arm. The strap plate 8 thus constitutes a counter element for allowing to tighten the axle 4, the axle pad 5 and the trailing arm 2 together at the front end of the clamping assembly. Because a strap plate 8 is used, there are no through bores necessary in the trailing arm 2 at that location. Thereby the trailing arm 2 is not weakened by bores at a location which during use under road conditions is typically subjected to high loads and stresses.

A damper 9 extends between the strap plate 8 and the carrier bracket 1 and is attached thereto. The damper 9 is not really relevant for the present invention.

The rear legs 62 of the straps 6 are passed through bores 23 which are provided in the trailing arm 2 itself. These bores 23 are located just behind the location where the axle body 4 crosses the trailing arm 2. In the embodiment shown, the distance between the bores 23 is less than the distance between the bores in the side portions 81 of the strap plate. Therefore, the mutual distance between the front legs 61 of the straps 2 is in the mounted state greater than the mutual distance between the rear legs 62, as can be seen best in FIG. 2. The front legs 61 may have different length than the rear legs 62, depending on the specific structure of the wheel axle suspension. In the embodiment shown the front legs 61 are longer than the rear legs 62.

An area 24 of the upper side of the trailing arm 2 situated around the bores 23, is countersunk with respect to the surrounding parts of said upper side. The area 24 is in the embodiment shown formed as a recess in the upper surface. The countersunk area allows that the end portion of the rear leg 62 and the corresponding nut 72 are arranged at least partially countersunk in the trailing arm 2. This allows that the bellows 3 is positioned more easily in a position overlapping the clamping area between the axle body 4 and the trailing arm 2. In other words, the air spring 3 can be positioned more to the front and the length of the wheel axle suspension is thereby reduced. In the embodiment shown the nut 72 and the end of the legs 62 are not fully countersunk, but it is envisaged that this may well be the case.

Figure 4:
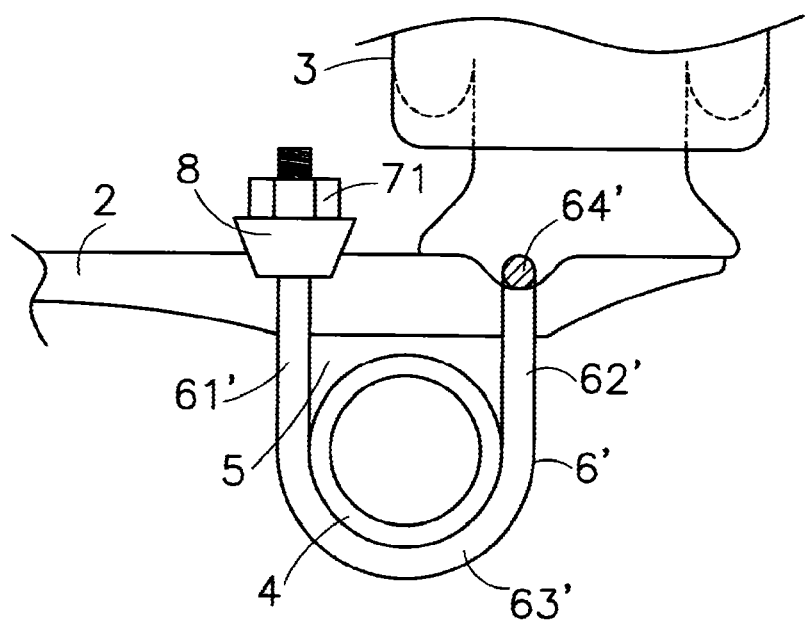
FIG. 4 shows a side view of another embodiment of a wheel axle suspension according to the invention.

In FIG. 4 an alternative is shown, in which the two straps are integrated into one single part. The strap 6' has a front leg 61' and a rear leg 62'. The front leg 61' is comparable to the front leg 61 of the separate straps 6 as described in the above. The rear legs 62' of the straps are interconnected by a bridge portion 64'. The bridge portion 64' is formed by end portions of the respective legs 62' that are bended towards each other. The bridge portion 64' extends over the upper side of the trailing arm in width direction. In the embodiment shown a groove like recess 24' is formed in transverse direction in the upper side of the trailing arm. The bridge portion 64' is received in the recess 24' such that it is countersunk with respect to the upper surface of the trailing arm. The air spring 3 is positioned over the bridge portion 64' as can be clearly derived from FIG. 4.

Figure 5:
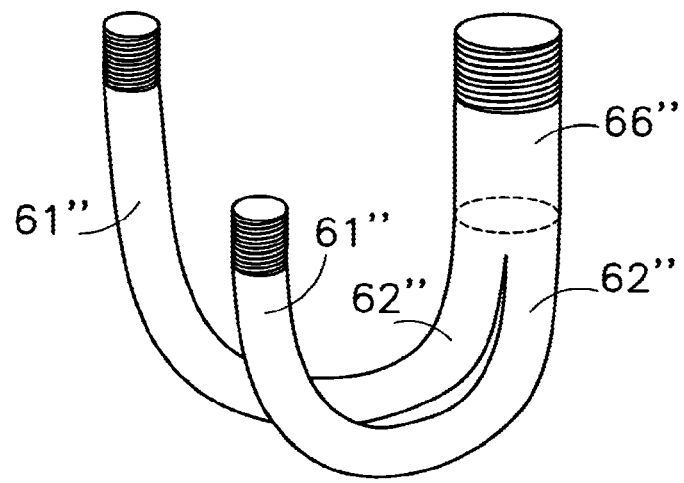
FIG. 5 shows an alternative for the straps.

Another embodiment comprises straps which have front legs 61" as described in the above, but have rear legs 62" that merge into each other to one leg 66" with one threaded end. This shown in FIG. 5. This means that in the trailing arm 2 only one through bore needs to be provided for passing through the portion 66". Another option is to have one bore, but two legs.

The invention claimed is:

1. A wheel axle suspension adapted to attach an axle body of a wheel axle to a vehicle chassis, the axle body having a circumference, the wheel axle suspension comprising:

a trailing arm with a front end that is hingedly coupled to the vehicle chassis and which extends crosswise to the axle body, an axle pad which is arranged between the axle body and the trailing arm, which has a recess in which part of the circumference of the axle body is received, and which has a side facing away from the axle body that engages the trailing arm, a pair of clamping straps extending around the axle body, each clamping strap having generally a U-shape with a front strap leg and a rear strap leg, strap nuts being provided on at least the front strap leg or the rear strap leg for tightening the axle body, the axle pad and the trailing arm together, and a clamping part arranged on the side of the arm facing away from the axle body and arranged at a front side of the axle body, which clamping part has side portions which extend beyond side edges of the trailing arm, which side portions are provided each with a bore through which an end portion of the front strap leg of one of the clamping straps extends, the clamping part constituting a counter part to tighten the axle body, the axle pad and the trailing arm together, wherein the trailing arm at a location at a rear side of the axle body is provided with at least one recess for receiving the end portions of the rear strap legs of the clamping straps.

2. The wheel axle suspension according to claim 1, wherein the at least one recess that is provided is constituted by a through bore through which the rear legs of the clamping straps extend.

3. The wheel axle suspension according to claim 1, wherein a distance between the front strap legs of the clamping straps is greater than a distance between the rear strap legs.

4. The wheel axle suspension according to claim 1, wherein an area surrounding the through bores on the side of the trailing arm facing away from the axle body is countersunk with respect to a trailing arm surface more remote from the bore.

5. The wheel axle suspension according to claim 1, wherein the front strap leg of each of the clamping straps is longer than the rear strap leg.

6. The wheel axle suspension according to claim 1, further comprising a pneumatic spring which is mounted to a rear end of the trailing arm, wherein the pneumatic spring is positioned over the end portions of the rear strap legs.

7. The wheel axle suspension according to claim 1, wherein the pair of clamping straps, of which each one extends on an opposite lateral side of the trailing arm as the other one, are formed monolithically.

8. The wheel axle suspension according to claim 7, wherein the rear strap legs of the clamping straps have an end portion that is bended in a width direction of the trailing arm towards the other rear strap leg, the bended end portions constituting a bridge portion that extends over an upper side of the trailing arm in the width direction.

9. The wheel axle suspension according to claim 8, wherein the recess for receiving the end portion of the rear strap legs is a groove in which the bridge portion is received.

10. The wheel axle suspension according to claim 1, wherein the clamping straps of the pair of clamping straps are formed monolithically in such a way that the rear strap legs of the respective clamping straps merge into each other to form one strap leg with one threaded end.

11. A clamping strap unit for a wheel axle suspension, the clamping strap unit comprising two clamping straps which in use extend around an axle body of a wheel axle to be suspended, each clamping strap having generally a U-shape with a front strap leg and a rear strap leg, which in use extend on a front side and a rear side respectively of the axle body, wherein each of the front and rear strap legs is provided with a threaded end portion on which a nut can be screwed, wherein the two clamping straps are monolithically formed having the rear strap legs of the clamping straps merging into each other to form one mutual leg with one single threaded end.

* * * * *